United States Patent Office 2,844,594
Patented July 22, 1958

2,844,594

3-ARYL-7-DIALKYLAMINOCOUMARINS

Robert Sidney Long, Bound Brook, and Mario Scalera, Somerville, N. J., assignors to American Cyanamid Company, New York, N. Y., a corporation of Maine No Drawing. Application September 21, 1955
Serial No. 535,737

6 Claims. (Cl. 260—343.2)

This invention relates to new dyes of the coumarin type and more specifically it relates to new 3-aryl-7-dialkyl-aminocoumarins of the formula

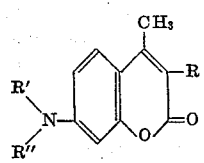

in which R is an aryl radical and R' and R" are lower alkyl radicals.

The compounds of the above formula are useful as dyes for non-cellulosic fibers such as wool, nylon, silk and cellulose acetate. They impart to such fibers various shades of yellow which are extremely useful especially in combination with other dyestuffs. The visual yellow color is especially enhanced by the presence of auxochromic groups, but is still present even when there are no such groups in the molecule. The fluorescence which these compounds all exhibit is generally greenish-blue and the compounds find good utility in admixture with reddish-shade optical bleaching agents to form a more neutral blue optical bleaching mixture. In such a use, when the simpler compounds of this series are chosen, the visible color is insufficient to injure the optical bleaching properties of the mixture.

The compounds of our invention include 4-methyl-7-di-lower alkylaminocoumarins substituted in the 3-position with carbocyclic aryl radicals of less than three 6-membered rings. The aryl groups may be substituted by a lower alkyl group such as methyl or ethyl, a halogen such as chloro, an alkoxy group such as methoxy or ethoxy, a nitro group, a sulfonic acid group, a carboxylic acid group or by similar substituents. The more strongly auxochromic these groups are, the more intense is the visible color of the yellow dye.

The new compounds of our invention are prepared by the reaction of an aryl diazonium compound with a 4-methyl-7-dialkylaminocoumarin. This may be represented by the equation:

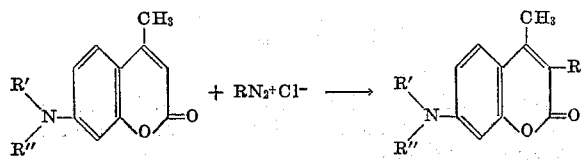

where R' and R" are lower alkyl and R represents an aryl or substituted aryl group. The diazo derivative is obtained by ordinary methods, generally in an aqueous acidic solution by the treatment of the amine with sodium nitrite. The diazo compound, in solution, is then added to a slurry of a 4-methyl-7-dialkylaminocoumarin, in a solvent such as acetone, along with an acid binding agent such as sodium acetate and a catalyst such as cupric chloride. Nitrogen is liberated and, after heating until the reaction is complete, the product is isolated. The solvent for the reaction should be a hydrophilic solvent such as acetone, pyridine, dioxane or the like. Other acid binding agents such as sodium carbonate, potassium carbonate, and the like can be used. Similarly other copper salts such as the acetate, bromide, and the like, can be used as the catalyst.

The success of this process for preparing the compounds of this invention is rather surprising since it would have been expected that a coupling reaction in the benzene ring would take place instead, with the formation of an azo compound. Although the reaction of a diazonium salt with coumarin itself takes a similar course and results in the formation of a 3-aryl coumarin, it might have been expected that in preparing these new compounds a coupling reaction would take place instead of a condensation of the aryl group directly to the coumarin heterocyclic rings. While the unsubstituted carbocyclic ring of coumarin is inert to azo couplings, the presence of a strongly activating group such as a dialkylamino group would normally be expected to increase the possibility of the azo coupling reaction, which is always found as a competing reaction, as evidenced by the tars usually observed when the Meerwein reaction is run. Surprisingly there is no great amount of tar formation and no formation of azo bodies as by-products.

Examples of the aromatic amine which may be used in this invention in the form of a diazonium salt are mononuclear amines such as aniline, p-nitraniline, p-chloroaniline, p-toluidine, o-toluidine, p-anisidine, o-chloroaniline, 2,4 - dichloroaniline, 2,5 - dichloroaniline, 2 - chloro - 4 - nitroaniline, anthranilic acid, sulfanilic acid, metanilic acid, and the like; also aromatic amines of the naphthalene series, such as alphanaphthylamine, betanaphthylamine, naphthionic acid, and the like, and amines of the diphenyl series such as 4-aminobiphenyl and its isomers.

The 4-methyl-7-dialkylamino coumarins which may be used in the preparation of the compounds of our invention include those in which the alkyl groups on the amino radical are methyl, ethyl, propyl, butyl and the like and in which the two alkyl groups may be the same or different.

The new compounds of the invention are generally yellow solids. They are strongly fluorescent and possess good affinity for fibers such as wool, superpolyamides such as nylon, cellulose acetate, silk, and the like. The dyeings are various depths of yellow with a strong fluorescence. When viewed under ultra-violet light, the fluorescence is markedly green. This is especially true when there are additional auxochromic groups such as methoxy or alkoxy, hydroxy, amino or substituted amino groups in the 3-aryl substituent.

The compounds of our invention which possess strong visible yellow hues are extremely useful for novel effects since they will present a different shade in incandescent light than they will in sun light, or when ultra violet light is used in contrast with incandescent light. In addition, the compounds of our invention which possess only a very little visible color, although still possessing a strong greenish blue fluorescence, are surprisingly useful in blending with optical bleaching agents. The latter class of dyestuffs possess various shades or hues of blue fluorescence and some of them are quite reddish-blue. These compounds, as a class however, are colorless in visible light and it is quite surprising that the yellow color of the dyes of the present invention does not prevent their use in blends with such optical bleaching agents. Such blends are often needed in order to correct the very reddish fluorescence of some of the optical bleaching agents and also in order to prevent the so-called pink build up which is observed with such reddish optical bleaching agents. This pink build up occurs when washing of the cloth in the presence of such optical bleaching agents has deposited so much of the latter on the cloth that the reddish tinge of the blue fluorescence becomes very visible to the naked eye. Coumarin optical bleaching agents such as 4-methyl-7-diethylaminocoumarin or 4-ethyl-7-diethylaminocoumarin especially show such pink build up and blending is often resorted to in order to eliminate this situation. The dyes of our invention can be blended readily with these optical bleaching agents to form neutral shades of white which after repeated application show no noticeable pink build up.

In applying the compound to the fiber or fabric the usual methods are employed. For optical bleaching purposes, the compounds may be mixed or combined with various cleansing agents such as the soluble alkali metal salts of higher fatty acids, such as are found in the ordinary laundry soaps, and various other types of synthetic cleansing agents. Also, other materials generally found in detergent compositions may be present. Such compositions may contain from about 0.001 to about 1.0% of the product.

For the dyeing of various fabrics ordinary methods of dyeing as used in the art may be applied. These products may also be used in coloring plastics.

The invention is further illustrated by the following examples, in which parts are by weight unless otherwise specified.

Example 1

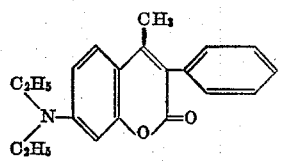

Twenty-six parts of aniline hydrochloride is added to 130 parts of concentrated hydrochloric acid with stirring and the slurry is cooled to about 5° C. A solution of 14.2 parts of sodium nitrite dissolved in 20 parts of water is then added with stirring, and the temperature is kept between 0–5° C. by the addition of about 130 parts of ice.

A slurry of 46.2 parts of 4-methyl-7-diethylaminocoumarin in 130 parts of acetone is prepared. To it is added 39 parts of anhydrous sodium acetate and a solution of 10 parts of cupric chloride dihydrate. The above diazo solution is added to this slurry with stirring and the mixture is heated to about 50° C. Nitrogen is evolved and the heating at 50° C. is continued until the reaction is substantially complete. The mixture is then steam distilled. The remaining aqueous layer is discarded and the solid residue is purified by recrystallization from ether and alcohol. The product is obtained as a light yellow solid.

Example 2

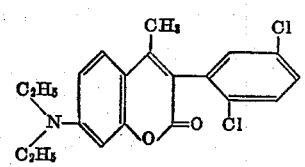

The procedure of Example 1 is followed except that 39.7 parts of 2,5-dichloroaniline hydrochloride is used in place of the aniline hydrochloride.

Example 3

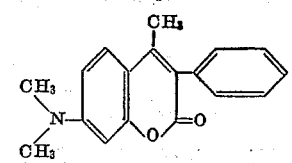

The procedure of Example 1 is followed except that 25.4 parts of 4-methyl-7-dimethylaminocoumarin is used in place of 4-methyl-7-diethylaminocoumarin. A similar product is obtained if 4-methyl-7-ethyl (methyl) aminocoumarin is used.

Example 4

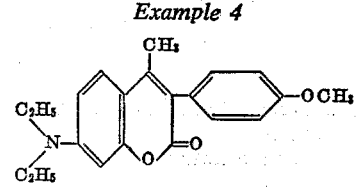

A solution of p-methoxybenzenediazonium chloride is prepared by diazotization of 15.4 parts of p-anisidine in 45 parts of 25% aqueous hydrochloric acid by the addition of a solution of 9 parts of sodium nitrite in 18 parts of water at 0–5° C.

A slurry of 28.9 parts of 4-methyl-7-diethylaminocoumarin in 82 parts of acetone is prepared and 40 parts of sodium acetate is added followed by 5 parts of cupric chloride dihydrate in 10 parts of water. To the resulting solution is then added the above adiazo solution and the mixture is heated with stirring to 50° C. until the reaction is substantially complete. The liberation of nitrogen causes foaming and the acetone is evaporated leaving a dark liquid residue in two layers. After cooling and dilution with water a viscous layer results and the aqueous portion is removed by decantation. The residue is extracted with water and then is purified from an ether solution giving a crude solid. This is further purified by recrystallization from methanol giving the product as brownish-yellow crystals.

Example 5

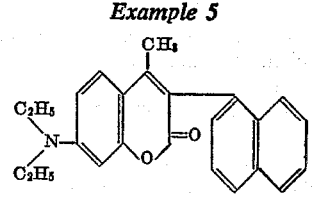

The procedure of Example 4 is followed, except that 17.9 parts of alpha-naphthylamine is used in place of the 15.4 parts of p-anisidine.

The same quantity of beta-naphthylamine may also be substituted for the p-anisidine in which case the 3-(beta-naphthyl) compound is obtained.

Example 6

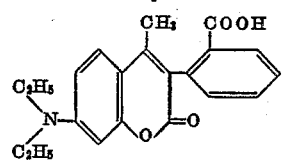

The procedure of Example 4 is followed, except that 17.2 parts of anthranilic acid is used in place of the 15.4 parts of p-anisidine.

Example 7

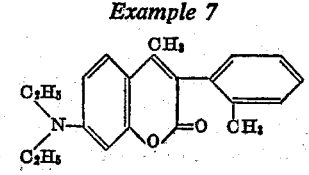

The procedure of Example 4 is followed except that 17.8 parts of o-toluidine is used in place of 15.4 parts of p-anisidine.

*Example 8*

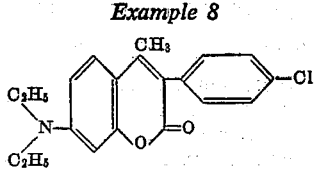

To a solution of 15.9 parts of p-chloroaniline in 50 parts of 25% aqueous hydrochloric acid is added a solution of 9 parts of sodium nitrite in 18 parts of water cooled to 0–5° C. Sufficient ice is added to keep the temperature below about 5° C. A slurry of 28.9 parts of 4-methyl-7-diethylaminocoumarin in 80 parts of acetone is prepared and 40 parts of anhydrous sodium acetate is then added. To the resulting solution are then added simultaneously with stirring the above diazo solution and a solution of 5 parts of cupric chloride dihydrate in 10 parts of water. The temperature increases spontaneously and the mixture is stirred until the foaming ceases. The mixture is then steam distilled and the partially solid residue which results is removed and purified by recrystallization from ethanol giving the product as brown crystalline material. By another recrystallization from ethanol the product is obtained as large yellow flakes.

*Example 9*

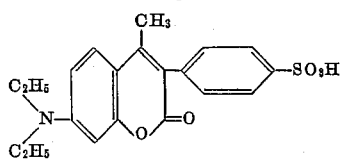

Sulfanilic acid (22 parts) is diazotized in the conventional manner. The resulting diazonium compound is then reacted with 28.9 parts of 4-methyl-7-diethylaminocoumarin according to the procedure of Example 8. The addition of salt to effect more complete precipitation of the product is desirable after steam distillation is complete. The product is this case is better purified by dissolving in water, clarifying the solution and then reprecipitating the product by the further addition of salt.

*Example 10*

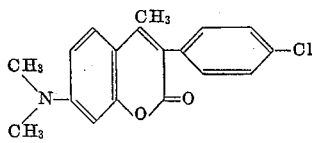

The procedure of Example 8 is followed except that 25.4 parts of 4-methyl-7-dimethylaminocoumarin is used in place of the 28.9 parts of 4-methyl-7-diethylaminocoumarin.

*Example 11*

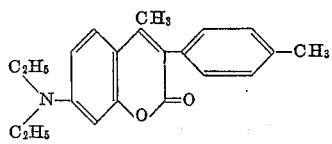

The procedure of Example 8 is followed except that 17.8 parts of p-toluidine is used in place of the 15.9 parts of p-chloroaniline.

*Example 12*

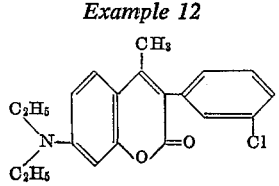

The procedure of Example 8 is followed except that m-chloroaniline is used in place of p-chloroaniline.

*Example 13*

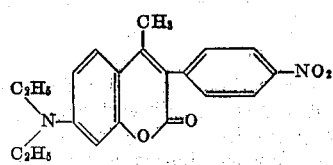

A solution of 9 parts of sodium nitrite in 18 parts of water is added drop-wise at 0–5° C. to a slurry of 17.3 parts of p-nitroaniline in 45 parts of 25% aqueous hydrochloric acid. Sufficient ice is added to keep the temperature below 5° C.

To a slurry of 28.9 parts of 4-methyl-7-diethylaminocoumarin in 80 parts of acetone is added 40 parts of sodium acetate and 5 parts of cupric chloride dihydrate in 10 parts of water. The above diazo solution is then added and the reaction mixture is warmed until foaming ceases. After steam distillation there remains a solid residue which is separated from the aqueous layer. The solid is recrystallized from alcohol to give the purified product as yellow crystals.

*Example 14*

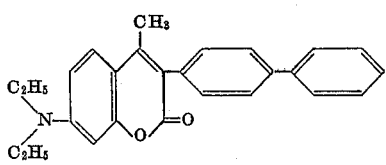

The procedure of Example 8 is followed using an equivalent quantity of 4-amino-biphenyl in place of the p-chloraniline. Similarly, isomeric products are obtained when the corresponding 2-aminobiphenyl and 3-aminobiphenyls are used.

*Example 15*

A brightener solution is prepared by dissolving a mixture of 1.5 parts of 3-phenyl-4-methyl-7-diethylaminocoumarin, and 8.5 parts of 4-methyl-7-diethylaminocoumarin in 90 parts of water and 110 parts by volume of ethanol. This is further diluted to give a solution containing 0.005% brightener.

A solution of 0.5 part of an alkyl aryl sulfonate in 100 parts of water is also prepared. To this is added 10 parts by volume of the above 0.005% brightener solution. A five part piece of previously scoured nylon knit is agitated in the resulting solution in the Launderometer for 25 minutes at 130° F.

The resulting dyeing is a neutral shade of white and noticeably whiter when compared with an untreated piece of nylon knit.

This process is repeated ten times on the same piece of cloth. After ten such washes, the cloth is still a neutral shade of white.

When 4-methyl-7-diethylaminocoumarin is used alone in the above process, there is a definite pink color imparted to the cloth.

Similar results are obtained on acetate cloth.

We claim:
1. 3-phenyl-4-methyl-7-diethylaminocoumarin.
2. 3-p-nitrophenyl-4-methyl-7-diethylaminocoumarin.
3. 3 - p - methoxyphenyl - 4 - methyl - 7 - diethylaminocoumarin.
4. 3 - p - chlorophenyl - 4 - methyl - 7 - diethylaminocoumarin.
5. 3 - (1 - naphthyl) - 4 - methyl - 7 - dimethylaminocoumarin.

6. Compounds represented by the formula:

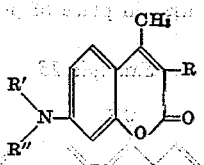

in which R is a carbocyclic aryl radical of less than three six-membered rings, said aryl radical being chosen from the group consisting of hydrocarbon aryls, lower alkylated aryls, chlorinated aryls, lower alkoxylated aryls, nitrated aryls, sulfonated aryls and carboxylated aryls, and R' and R" are lower alkyl groups.

References Cited in the file of this patent

UNITED STATES PATENTS

| | | |
|---|---|---|
| 2,292,461 | Meerwein | Aug. 11, 1942 |
| 2,341,009 | Axelrad | Feb. 8, 1944 |
| 2,600,375 | Ackermann | June 17, 1952 |
| 2,610,152 | Ackermann | Sept. 9, 1952 |
| 2,646,355 | Zweifel | July 21, 1953 |
| 2,654,713 | Fleck | Oct. 6, 1953 |